(12) United States Patent
Hsu

(10) Patent No.: US 7,007,591 B2
(45) Date of Patent: Mar. 7, 2006

(54) STEAM VALVE FOR A COFFEE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 621 days.

(21) Appl. No.: 10/321,380

(22) Filed: Dec. 18, 2002

(65) Prior Publication Data

US 2004/0118293 A1    Jun. 24, 2004

(51) Int. Cl.
*A47J 31/00* (2006.01)
*F16K 15/00* (2006.01)

(52) U.S. Cl. ............ 99/293; 99/279; 137/543.23

(58) Field of Classification Search .......... 99/293, 99/279, 323.1, 292, 294; 137/543.23, 540; 126/348, 369, 379.1, 381.1
See application file for complete search history.

(56) References Cited

U.S. PATENT DOCUMENTS 3,568,708 A * 3/1971 Ashman ............. 137/234.5
5,033,506 A * 7/1991 Bofinger et al. ....... 137/516.27
5,388,502 A * 2/1995 Hufnagl .................. 99/295
6,360,651 B1 * 3/2002 Kim et al. ............... 99/293
6,647,862 B1 * 11/2003 Lin ......................... 99/285

\* cited by examiner

*Primary Examiner*—Reginald L. Alexander
(74) *Attorney, Agent, or Firm*—Rosenberg, Klein & Lee

(57) ABSTRACT

A steam valve for a coffee maker comprises a valve, a valve seat, a valve block, a spring, a steam tube and a cap, wherein the valve has a plate on the top, the valve seat has a through hole, notches interconnected with the through hole, and a conical hole underneath the through hole, the valve block has a conical shape at the top, the valve block is placed in the conical hole, the lower portion of the valve is inserted in the valve block, the upper portion of the steam tube is secured with the valve seat, the lower portion of the valve is inserted into the valve block, the upper portion of the steam tube is secured with the valve seat, the spring seats in the steam tube with its top end urging the valve block to engage with the upper portion of the conical hole of the valve seat, whereas the conical shape of the valve block blocks the through hole and the notches of the valve seat, by pushing the plate of the valve downward, the stem pushes the valve block downward, thus the though hole and the notches are in open status.

1 Claim, 5 Drawing Sheets

STEAM VALVE FOR A COFFEE MAKER

FIELD OF THE INVENTION

This invention relates to a coffee maker, and more particularly to a steam valve of a coffee maker.

BACKGROUND OF THE INVENTION

The general operation system of a steam valve for a coffee maker comprises a steam chamber 7, as shown in FIG. 1, which has a water inlet 71, a heater 72, a water outlet 73 and a filter 74. The water inlet 71 provides water into the steam chamber 7, and the water is heated and transformed into steam and flows through the water outlet 73 and the filter 74 into a container. A conventional coffee maker has a through hole 81 in a steam valve 8, as shown in FIG. 5, with a conical ring 82 at the middle portion thereof, and a valve block 83 underneath the conical ring 82. The steam valve 8 has a cap 85 at the lower portion, and a spring 84 seats between the valve block 83 and the cap 85. The spring 84 urges the valve block 83 against the conical ring 82 to block the through hole 81. The cap 85 has an axial through hole 851 and a transverse through hole 852 interconnected with the axial through hole 851. The transverse through hole 852 is connected outwardly. When a pressure is applied to push the valve block 83 downward, which opens the through hole 81, the axial through hole 851 and the transverse through hole 852, and steam is guided to flow through. Due to the conical shape of the valve block 83, the pushing force has to be strong enough in order to push the valve block 83. The steam may spread out in an unstable status and may even cause an accident of burning.

In view of this and many other shortcomings, the inventor has invented the present invention to make improvements.

SUMMARY OF THE INVENTION

It is the primary object of the present invention to provide a steam valve for a coffee maker, which provides a stable steam volume.

It is another object of the present invention to provide a steam valve for a coffee maker, which is safe in use.

It is a further object of the present invention to provide a steam valve for a coffee maker, which is inexpensive in manufacture.

DETAILED DESCRIPTION OF THE PREFERRED EMBODIMENT

Figure 1:
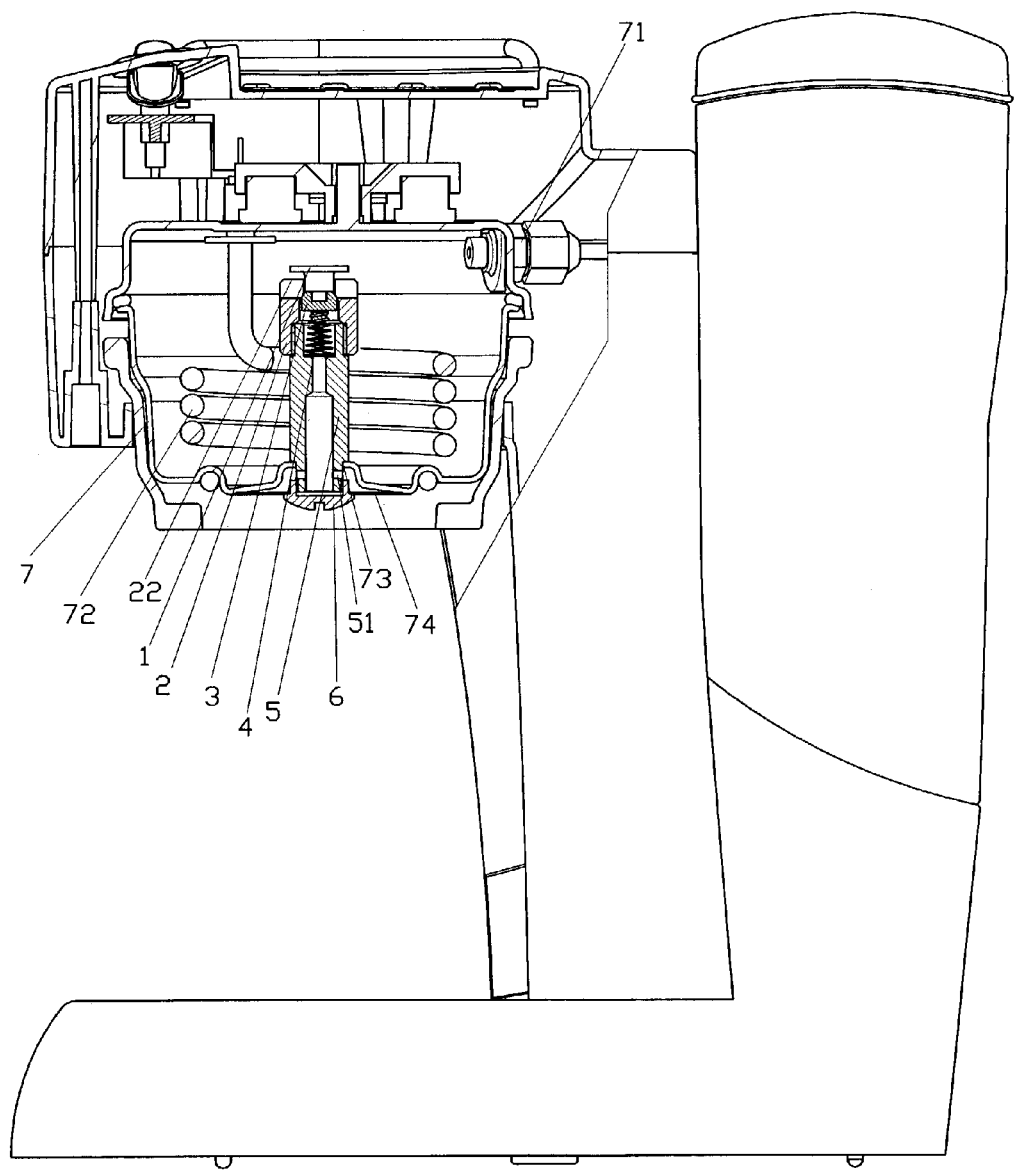
FIG. 1 is a side sectional view of the present invention incorporated with a coffee maker.
Figure 2:
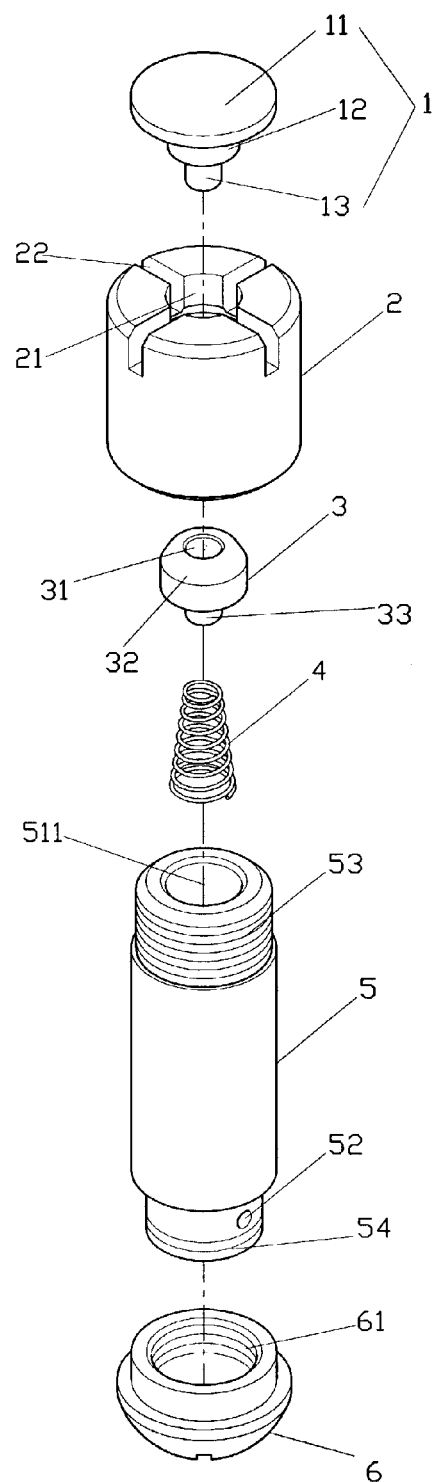
FIG. 2 is an exploded view of the present invention.
Figure 3:
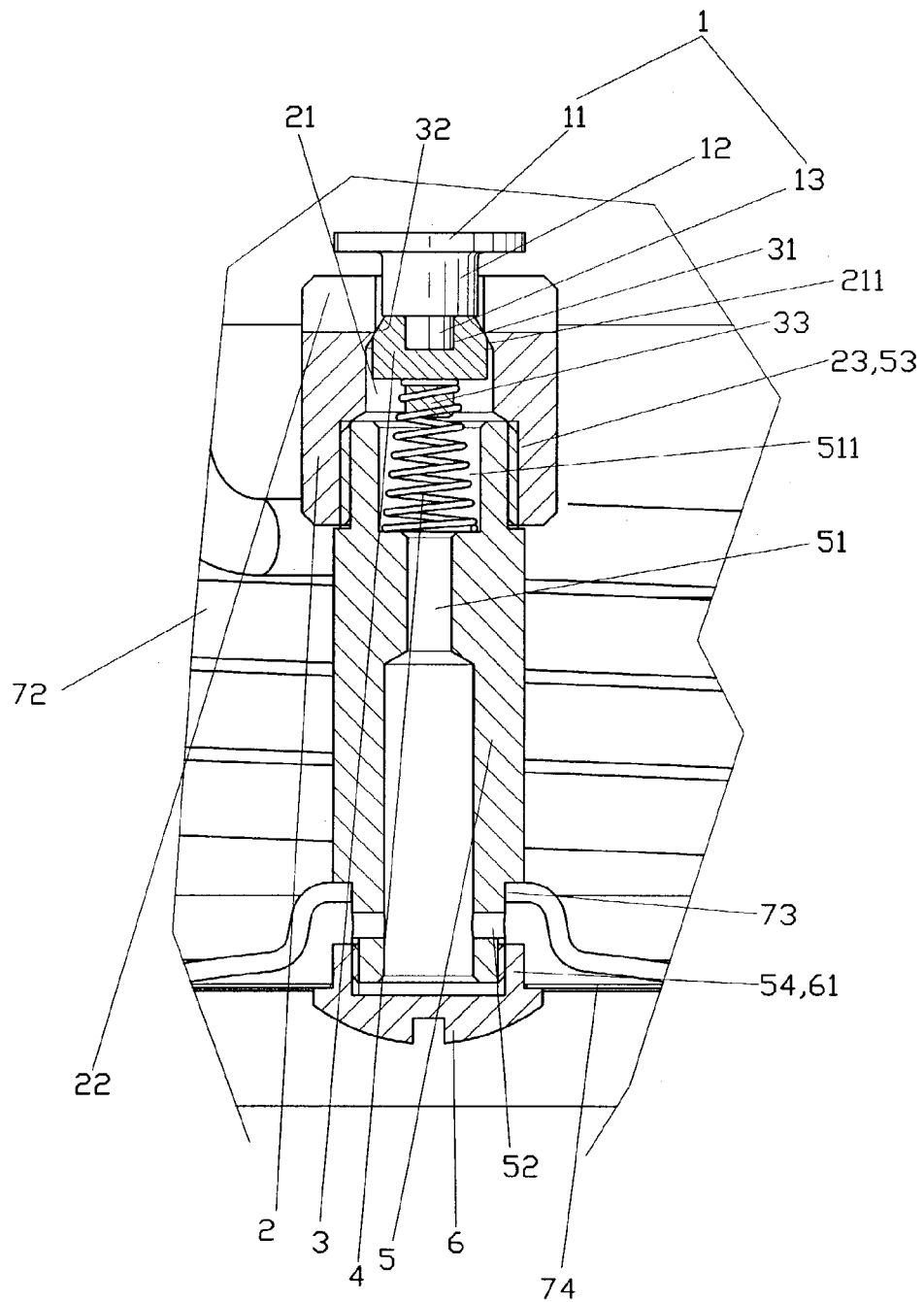
FIG. 3 is a cross-sectional view showing the steam valve of the present invention in a closed status

The steam valve of the present invention is secured in a steam chamber 7. The steam chamber 7 comprises a water inlet 71, a heater 72, an outlet 73, and a filter 74. The water inlet 71 guides water into the steam chamber 7 and the water is transformed into steam by the heater 72. The steam valve is secured in the outlet 73 and the filter 74, as shown in FIGS. 2 and 3. The present invention is characterized by that the steam valve comprises a valve 1, a valve seat 2, a valve block 3, a spring 4, a steam tube 5 and a cap 6.

The valve 1 comprises a plate 11 on the top, a plunge 12 underneath the plate 11, and a stem 13 extending downward from the plunge 12.

The valve seat 2 has a through hole 21 at the center. The inner diameter of the through hole 21 is slightly larger than the outer diameter of the plunge 12 but smaller than the outer diameter of the plate 11. The top of the valve seat 2 is formed with a plurality of notches 22, which are interconnected with the through hole 21. The through hole 21 provides a conical hole 211 at the lower portion with female threads 23 underneath the conical hole 211.

The valve block 3 also has a through hole 31 at the center, adapted to receive the stem 13 of the valve 1 therein. The upper end of the valve block 3 is a conical shape 32, which corresponds to the conical shape of the conical hole 211 and engages with the upper portion of the conical hole 211. The valve block 3 also comprises a post 33 at the lower end thereof.

The spring 4 sleeves the post 33 of the valve block 3 with its upper portion. The steam tube 5 has a through hole 51 axially with a large hole 511 at the top thereof to receive the lower portion of the spring 4, a transverse through hole 52 extending horizontally across the lower end of the steam tube 5 and interconnected with the through hole 51. Both the upper portion and the lower portion of the steam tube 5 are formed with male threads 53 and 54.

The cap 6 is formed with female threads 61 at upper inwards.

The valve block 3 is inserted into the conical hole 211 of the valve seat 2. The plunge 12 of the valve 1 is inserted into the through hole 21 of the valve seat 2 with the stem 13 inserted into the through hole 31 of the valve block 3. The post 33 of the valve block 3 is inserted into the upper portion of the spring 4 which has the lower portion inserted into the large hole 511 of the steam tube 5. The male threads 53 of the upper portion of the steam tube 5 mesh with the female threads 23 of the valve seat 2 while the male threads 54 of the lower portion of the steam tube 5 mesh with the female threads 61 of the cap 6. The spring 4 urges the conical shape 32 of the valve block 3 securely within the conical hole 211 of the valve seat 2 and blocks the interconnection between the notches 22 and the through hole 21 of the valve seat 2. When pushing the valve 1 down, the stem 13 pushes the valve block 3 and the spring 4 downward, thus the notches 22 and the through hole 21 are opened.

Figure 4:
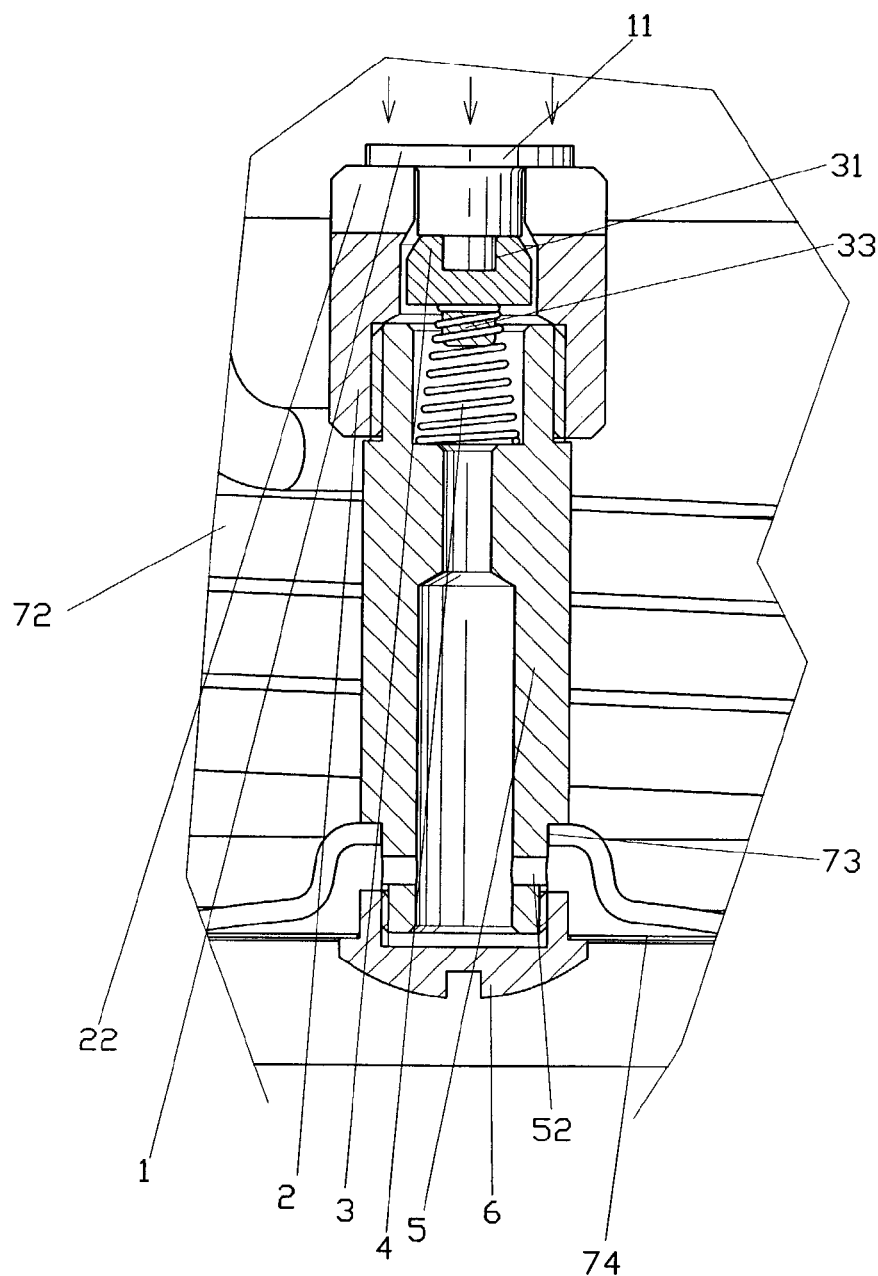
FIG. 4 is another cross-sectional view, similar to FIG. 3, showing the steam valve in an open status.
Figure 5:
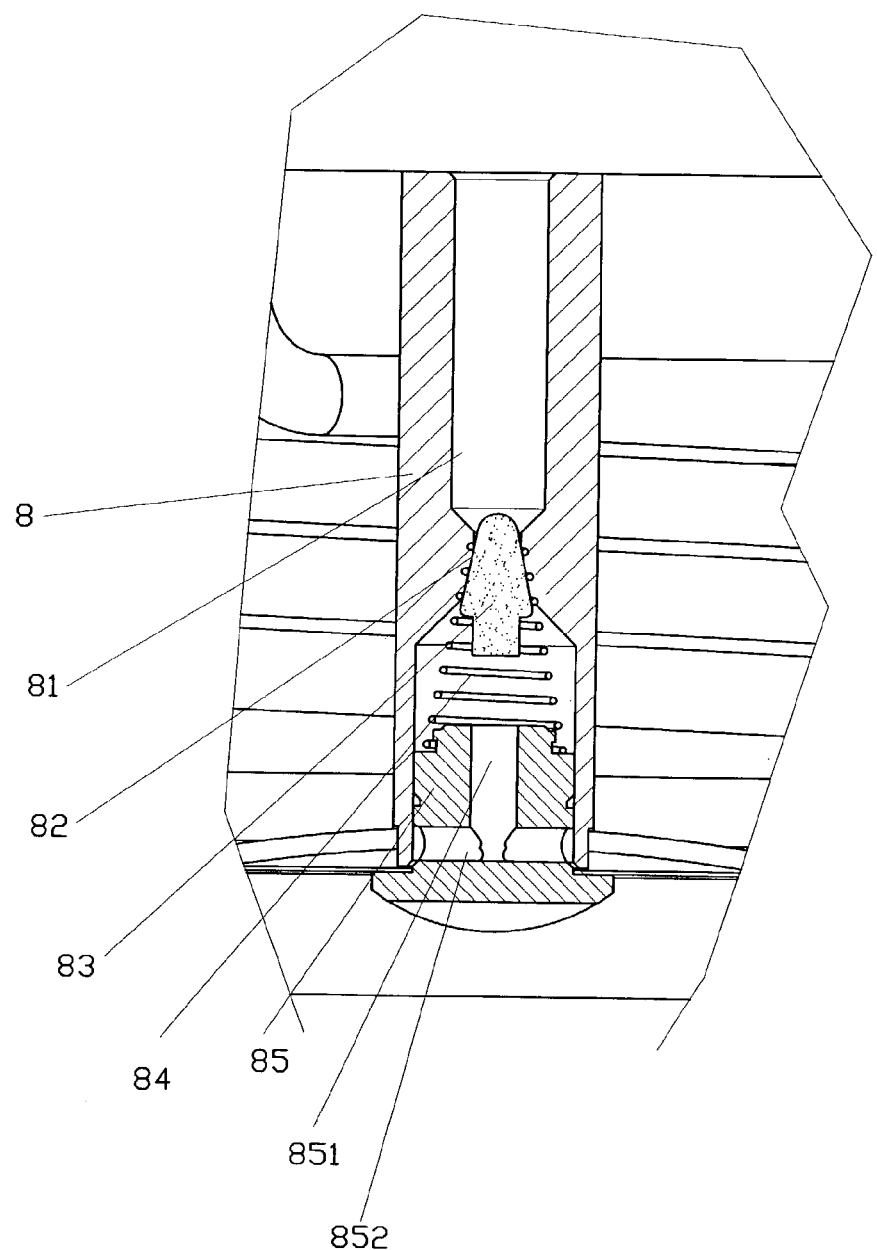
FIG. 5 is a cross-sectional view of a steam valve of a prior art.

To operate the present invention, the plate 11 of the valve 1 is pushed down, as shown in FIG. 4, the notches 22 and the through hole 21 are open, thus steam may evaporate from the through hole 21, the large hole 511, the through hole 51 and out from the transverse through hole 52.

I claim:

1. A steam valve for a coffee maker comprising a steam valve secured in a steam chamber, said steam chamber comprising a water inlet, a heater, an outlet and a filter, wherein said water inlet guiding water into said steam chamber, and said heater vaporizing water, said steam valve being secured in said outlet and said filter, the improvements comprising said steam valve having a valve, a valve seat, a valve block, a spring, a steam tube and a cap, wherein said valve comprising a plate on a top, a plunge underneath said plate, and a stem extending downward from said plunge;

said valve seat having an axial through hole, an inner diameter of said axial through hole being slightly larger than an outer diameter of said plunge but smaller than an outer diameter of said plate of said valve, said valve seat comprising a plurality of notches on a top end, said notches being interconnected with said axial through hole, and said axial through hole providing a conical hole at a lower portion with female threads underneath said conical hole;

said valve block comprising an axial through hole adapted to receive said stem of said valve therein, a top portion of said valve block being in conical shape corresponding to said conical hole of said valve seat and engaging with an upper portion of said conical hole, said valve block further comprising a post extending downward from said conical shape;

said spring having an upper portion sleeved onto said post of said valve block;

said steam tube comprising an axial through hole with a large hole at a top portion to receive a lower portion of said spring therein, a transverse through hole being formed at a lower portion of said steam tube and interconnected with said axial through hole, both an upper end and an lower end of said steam tube comprising male threads;

said cap comprising female threads at upper inwards;

whereas said valve block being placed in said conical hole of said valve seat, said plunge of said valve being inserted into said axial through hole of said valve seat and said stem being inserted into said axial through hole of said valve block, said post of said valve block is inserted into said upper portion of said spring, said lower portion of said spring being seated in said upper portion of said steam tube, said female threads of said valve seat being secured with said male threads of said upper end of said steam tube, while said female threads of said cap being secured with said male threads of said lower end of said steam tube, whereas said spring urging said valve block within said conical hole of said vale seat tightly, whereas said notches and said axial through hole of said valve seat being blocked by said valve block, when pushing said plate of said valve downward, said stem of said valve pushes said valve block downward, thus said notches and said axial through hole of said valve seat being open and interconnected.

* * * * *